United States Patent
Smith et al.

[11] Patent Number: 5,179,321
[45] Date of Patent: Jan. 12, 1993

[54] CENTERING CIRCUIT

[75] Inventors: Lawrence E. Smith; James A. Wilber, both of Indianapolis, Ind.

[73] Assignee: Thomson Consumer Electronics, Inc., Indianapolis, Ind.

[21] Appl. No.: 814,894

[22] Filed: Dec. 30, 1991

[51] Int. Cl.⁵ .................. H01J 29/70; H01J 29/72
[52] U.S. Cl. .................................. 315/398; 358/158
[58] Field of Search ............... 315/398; 358/148, 150, 358/158

[56] References Cited

U.S. PATENT DOCUMENTS

| | | | |
|---|---|---|---|
| 4,037,137 | 7/1977 | Dietz | 315/398 |
| 4,591,910 | 5/1986 | Lai et al. | 358/158 |

Primary Examiner—Theodore M. Blum
Attorney, Agent, or Firm—Joseph S. Tripoli; Joseph J. Laks; Daniel E. Sragow

[57] ABSTRACT

Retrace pulses are integrated by an R-C network to produce a ramp signal. The resistive member of the R-C network is bypassed by a diode to provide rapid retrace at the conclusion of the ramp portion of the integrated signal. A voltage divider at the output of the integrator adjusts the DC level of the ramp signal without affecting the constant of integration of the R-C network.

15 Claims, 1 Drawing Sheet

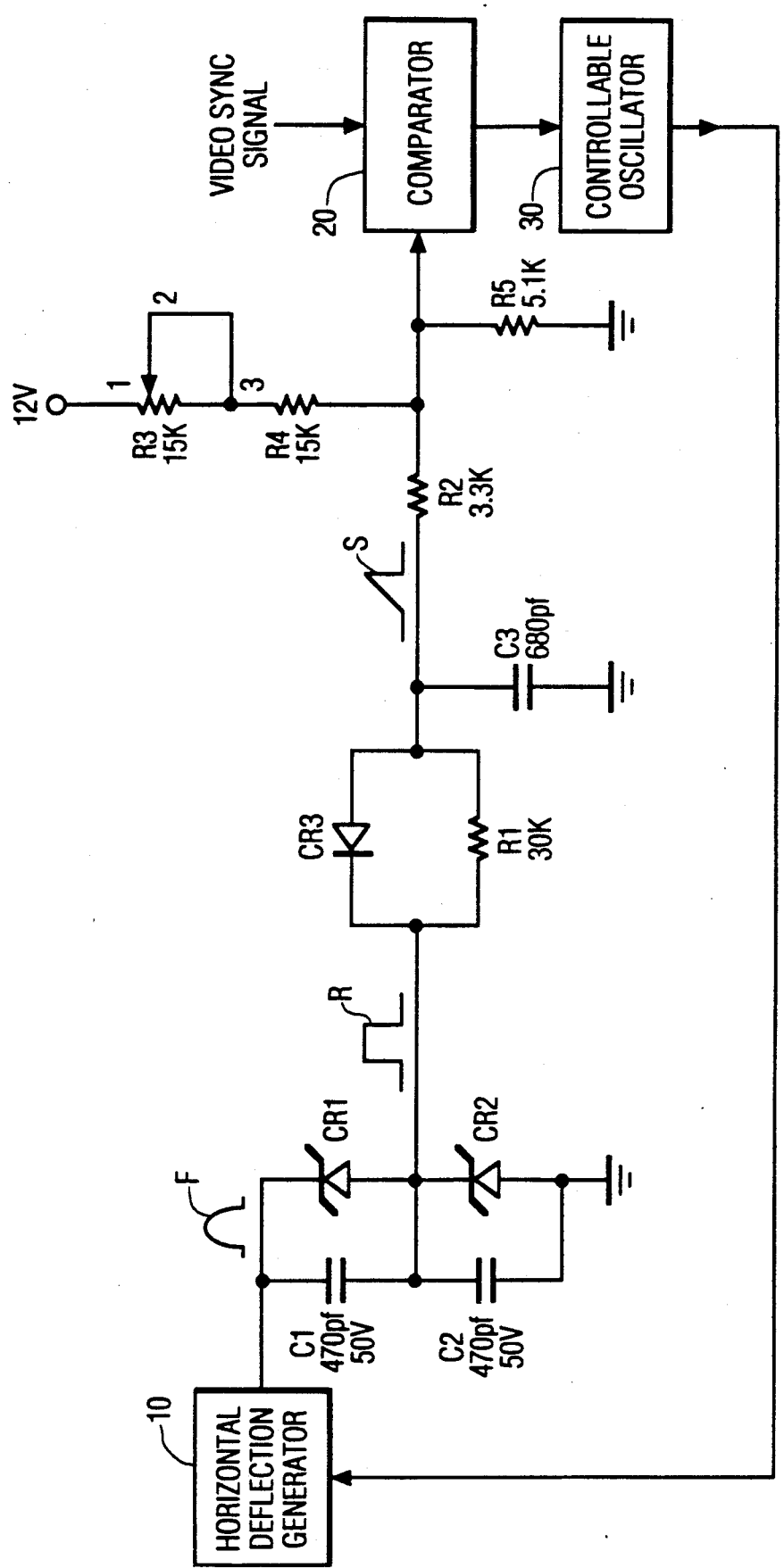

CENTERING CIRCUIT

This invention relates to the field of television oscillator frequency control circuits and, more particularly, to arrangements for adjusting the phase of horizontal deflection pulses to control horizontal centering.

Television receivers display video information on a raster which is scanned horizontally at a first rate and scanned vertically at a second, generally slower, rate. The television video information comprises amplitude modulated synchronizing pulses by which the raster scanning is synchronized with the information to be viewed. The television receiver can be synchronized with the horizontal rate synchronizing pulses in an indirect manner to provide immunity against incidental noise which may occur between the source of video information and the receiver. One such indirect manner is a phase locked loop in which a phase detector has horizontal rate synchronizing pulses applied to one input, and ramp signals related to the horizontal deflection applied to the other input. A phase detector responds to these inputs and produces a control signal which controls a horizontal rate oscillator at a frequency and phase which is an average of the incoming horizontal synchronizing signals. The horizontal oscillator, in turn, drives a horizontal deflection generator, which produces recurrent retrace pulses which are integrated to produce the recurrent ramp or sawtooth signal input to the phase detector.

The horizontal deflection current generator can be used to produce the ultor high voltage for energizing a kinescope display device. This is accomplished by a step-up or flyback transformer which transforms the retrace pulses to a high potential which is rectified to produce the ultor potential. The interval during which the ultor capacitor terminal of the kinescope receives charging current from the rectifier can be increased by tuning the step-up or flyback transformer to an odd harmonic of the retrace frequency. This decreases the effective source impedance of the ultor voltage generator, and indents the top of the retrace voltage pulse, producing an irregular pulse waveform.

Integrating the indented pulse produces a ramp voltage having a nonlinear change with time. Further, changes in the beam current of the kinescope, resulting from changes in the video being displayed, affect the loading on the flyback transformer and may cause further changes in the shape of the retrace voltage pulse. This may cause changes in the rate of rise of the ramp portion of the sawtooth signal which is used as one input to the phase detector. Such nonlinearities may adversely affect the control of the horizontal oscillator by the phase lock loop.

It is known to use zener diodes to shape the retrace pulses into rectangular pulses, and to integrate the rectangular pulses in an R-C integrator to form the ramp portion of the sawtooth signal to be fed to one input of the phase detector. In order to provide adjustment of the horizontal centering of the displayed image, the resistive member of the R-C integrator has been made adjustable, so as to vary the constant of integration, and to thereby vary the value at which the generated ramp portion of the sawtooth signal intersects the horizontal sync signal.

The prior art method of providing horizontal centering for the displayed image has not been as satisfactory as desired because the value of the resistive element of the R-C network can only be changed a small amount without affecting the linearity of the integrated signal, for example by changing the constant of integration.

An aspect of this invention provides an improved centering control for a video display apparatus for displaying a video signal. A circuit derives a signal from the video signal indicative of the horizontal timing of the video signal. A flyback signal from a horizontal deflection generator, or a signal derived therefrom, is integrated to produce a signal indicative of the timing of horizontal deflection. A comparator for the video indicative signal and the deflection indicative signal produces a feedback signal which controls the timing of a deflection current produced by the deflection generator. In order to adjust the timing of horizontal trace with respect to the video signal, the DC bias of the deflection indicative signal input to the comparator is adjusted without substantially affecting the integration.

Another aspect of this invention provides a synchronizing system for a deflection circuit for a video display, in which a deflection timing signal is generated by integrating pulses indicative of deflection timing pulses. Means, operable independently of said deflection timing signal, phase adjusts said deflection timing signal relative to said deflection circuit. A phase locked loop has a phase comparator for receiving a signal indicative of a synchronizing component in a video signal and said phase adjusted deflection timing signal. The phase locked loop has a controllable oscillator responsive to said phase comparator for controlling said deflection circuit.

A further aspect of this invention provides a deflection circuit for a video display, which generates substantially rectangular pulses responsive to flyback pulses. The rectangular pulses are integated to generate a sawtooth waveform having ramp portions whose slope is determined by a constant of integration, at a predetermined DC bias level. The DC bias level is adjusted without disturbing the slope of the ramp portions of said sawtooth waveform. A phase comparator receives a signal indicative of a synchronizing component in a video signal and said DC bias level adjusted sawtooth waveform. A controllable oscillator which is responsive to said phase comparator controls the deflection circuit.

The sole FIGURE shows a schematic diagram of an integrating and centering circuit according to an aspect of the invention.

A flyback pulse F, which may originate from a flyback transformer in a horizontal deflection generator 10, is fed to the junction of capacitor C1 and zener diode CR1. Zener diode CR1 becomes conductive when the voltage at its cathode reaches its zener voltage. Zener diode CR2 also becomes conductive when its cathode voltage reaches its zener voltage. As a result, the junction of zener diodes CR1 and CR2 produces a signal R whose waveform approximates a rectangular wave, whose height equals the value of the zener voltage of zener diode CR2. The waveform is made rectangular because zener diode CR1 does not conduct until its zener voltage is reached.

The rectangular signal R produced at the junction of the two zener diodes is fed to an integrating network comprising resistor R1 and capacitor C3. The output of the integrating network is a sawtooth signal S across capacitor C3.

At the end of the rectangular signal, diode CR3 conducts to bypass resistor R1. As a result, capacitor C3 quickly discharges, which produces the vertical portion of the sawtooth signal in preparation for the next rectangular pulse. The sawtooth signal S is coupled through resistor R2 to a sawtooth signal input of a phase detector, not shown.

The raster must be shifted in phase with respect to the video signal in order to center the video display in the raster. This can be accomplished by shifting the phase of the raster itself.

A phase detector, such as included in the TA8680 color television processor IC made by Toshiba, of Japan includes a comparator 20 which, compares a ramp signal with a horizontal synchronization pulse of the video signal in order to produce a signal which controls a voltage controlled horizontal oscillator 30. The output of the oscillator 30 is fed to the horizontal deflection generator 10, to form a phase locked loop. The output of the phase detector, and thus the output frequency of the horizontal oscillator, can be varied by varying the DC level of the ramp signal. For example, if the DC level of the positive-going ramp is changed, the ramp signal will coincide with the synchronization pulse at a different level, thus producing a different voltage to the control terminal of a voltage controlled oscillator, to change the phase of the oscillator.

Resistors R3, R4 and R5 constitute a voltage divider. Adjustment of resistor R3 varies the DC level of the output ramp signal S to the phase detector at the junction of resistors R4 and R5, without varying the constant of integration of the integrator comprising resistor R1 and capacitor C3. In this way, raster centering can be controlled without the disadvantages that occur when the constant of integration is changed.

What is claimed is:

1. A video display apparatus for displaying a video signal comprising:
   means for deriving a signal from said video signal indicative of the horizontal timing of said video signal;
   means for deriving, by an integrating means, a signal from a horizontal flyback transformer, indicative of horizontal deflection timing;
   means for comparing said video indicative signal with said deflection indicative signal to produce a feedback signal which controls timing of a deflection current produced by said deflection generator; and
   means for adjusting the DC bias of the deflection indicative signal input to said comparing means without substantially affecting said integration, to control the relative timing of horizontal trace and the said video signal.

2. A video display apparatus as defined by claim 1, wherein said means for deriving by an integrating means comprises:
   means for integrating flyback pulses from said horizontal deflection generator; and
   a diode coupled across a portion of said integrating means.

3. A video display apparatus as defined by claim 2, in which said integrating means is a resistive-capacitive network, and said diode is coupled across the resistive portion of said network.

4. A video display apparatus as defined by claim 1 in which said means for deriving said deflection indicative signal comprises: a diode network for shaping retrace pulses from said deflection generator; and
   an integrator for forming a ramp signal from said shaped pulses.

5. A video display apparatus as defined by claim 4, in which said diode network comprises a pair of series coupled zener diodes.

6. A video display apparatus as defined by claim 4 in which said integrator comprises a resistive-capacitive network and a diode coupled across the resistive component of said network.

7. A synchronizing system, comprising:
   a deflection circuit for a video display, developing flyback pulses indicative of horizontal deflection;
   means for generating a deflection timing signal by integrating pulses indicative of said flyback pulses;
   means, operable independently of said means for generating said deflection timing signal, for phase adjusting said deflection timing signal relative to said deflection circuit; and
   a phase locked loop having a phase comparator for receiving a signal indicative of a synchronizing component in a video signal and said phase adjusted deflection timing signal, and having a controllable deflection oscillator responsive to said phase comparator for controlling said deflection circuit.

8. The system of claim 7, wherein said phase adjusting means comprises means for adjusting the DC bias level of said deflection timing signal.

9. The system of claim 7, wherein said means for generating said deflection timing signal by integrating pulses indicative of said timing pulses has a constant of integration determined by a timing network which operates substantially independently of said phase adjusting means.

10. The system of claim 7, wherein said deflection timing signal is substantially a sawtooth waveform having successive ramp portions characterized by a slope which remains constant during said phase adjustment.

11. The system of claim 7, wherein:
   said means for generating said deflection timing signal comprises a resistive-capacitive network defining a time constant of integration for a substantially sawtooth waveform having a DC bias level; and,
   said phase adjusting means comprises means for adjusting said DC bias level without affecting said time constant of integration.

12. A synchronizing system, comprising:
   a deflection circuit for a video display, developing flyback pulses;
   means for generating substantially rectangular pulses responsive to said flyback pulses;
   means for integrating said rectangular pulses to generate a sawtooth waveform having ramp portions whose slope is determined by a constant of integration, at a predetermined DC bias level;
   means for adjusting said DC bias level, without disturbing said slope of said ramp portions of said sawtooth waveform;
   a phase comparator for receiving a signal indicative of a synchronizing component in a video signal and said DC bias level adjusted sawtooth waveform; and,
   a controllable oscillator responsive to said phase comparator for controlling said deflection circuit.

13. The system of claim 12, wherein said means for generating said substantially rectangular pulses comprises two zener diodes coupled in series between said deflection circuit and a source of reference potential.

14. The system of claim 12, wherein said means for integrating said rectangular pulses comprises:

a resistive-capacitive network; and, diode coupled across the resistive portion of said network.

15. The system of claim 12, wherein said means for adjusting said DC bias level of said sawtooth waveform comprises a voltage divider network having a potentiometer.

* * * * *